United States Patent Office 3,162,637
Patented Dec. 22, 1964

3,162,637
PIPERAZINOALKYL ESTERS OF 9-HYDROXY-FLUORENE-9-CARBOXYLIC ACID
John H. Biel, Milwaukee, Wis., assignor to Colgate-Palmolive Company, a corporation of Delaware
No Drawing. Filed Mar. 14, 1960, Ser. No. 14,502
7 Claims. (Cl. 260—268)

This invention relates to piperazinoalkyl esters of 9-hydroxyfluorene-9-carboxylic acid and the use of such compounds as psychotherapeutic agents.

This application is a continuation-in-part of my copending application Serial No. 768,042, filed October 20, 1958, now abandoned.

According to the present invention there are provided novel piperazinoalkyl esters of 9-hydroxyfluorene-9-carboxylic acid of the formulae

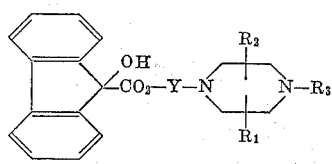

wherein Y is a lower straight or branched alkylene chain of at least 2 carbons and advisably of not more than 5 carbon atoms, $R_1$ and $R_2$ are hydrogen or lower alkyls, and particularly methyl, $R_3$ is an alkyl group such as methyl, ethyl, propyl, isopropyl and butyl, aralkyl groups and particularly phenyl-lower alkyl groups and nuclear-substituted phenyl-lower alkyl groups such as benzyl, phenylethyl, and similar groups having substituents on the phenyl such as halo(chlorine, bromine), amino, nitro, trifluoromethyl, lower alkoxy and lower alkylenedioxy such as p-chlorophenylpropyl, p-methoxyphenylbutyl and 3,4-methylenedioxyphenylpropyl, hydroxyalkyl groups in which the alkyl group has at least 2 carbons such as beta-hydroxyethyl, beta-hydroxypropyl, gamma-hydroxypropyl, 4-hydroxybutyl, and hydroxyalkoxy alkyl groups in which the alkyl group contains 2 carbons between the piperazine ring and the ether oxygen such as beta-hydroxyethoxyethyl ($—CH_2CH_2OCH_2CH_2OH$), beta-hydroxyethoxyisopropyl and hydroxyethoxypropyl, acyloxyalkyl groups such as the beta-acetoxyethyl, beta-carbamyloxyethyl, beta-acetoxyisopropyl, N,N-dimethylcarbamyloxyethyl and acetoxypropyl groups, acyloxyalkoxyalkyl groups such as the beta-acetoxyethoxyethyl, beta-acetoxyethoxyisopropyl and beta-carbamyloxyethoxyisopropyl groups, and benzyloxy lower alkyl groups such as the benzyloxyethyl and benzyloxyisopropyl groups and benzyloxyalkoxyalkyl groups such as the beta-benzyloxyethoxyethyl and beta-benzyloxyethoxyisopropyl groups, and nontoxic acid addition salts thereof.

The compounds of this invention can be produced by several processes, one of which comprises reacting a lower alkyl ester of 9-hydroxy-9-fluorenecarboxylic acid with a piperazinoalkanol. This process may be represented as follows:

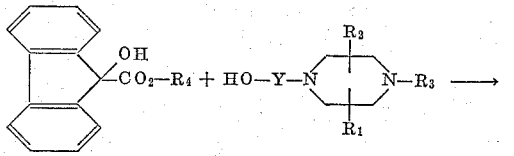

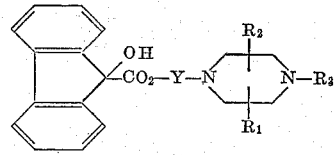

wherein $R_1$, $R_2$, $R_3$ and Y have the significance previously assigned except that the hydroxy groups on the hydroxyalkyl and hydroxyalkoxyalkyl groups are previously either esterified or etherified to block them during the reaction, and $R_4$ is a lower alkyl group.

Representative of the lower alkyl esters of 9-hydroxy-9-fluorenecarboxylic acid which can be so reacted are the methyl, ethyl and propyl esters of 9-hydroxy-9-fluorenecarboxylic acid.

Some of the piperazinoalkanols which can be employed in the process are 1 - methyl - 4 - piperazinopropanol, 1-methyl - 4 - piperazinoisopropanol, 1,2-dimethyl-4-piperazinoethanol, 1,2,5-trimethyl-4-piperazinoamyl alcohol, 1-phenylisopropyl - 4 - piperazinoethanol, 1-acetoxyethyl-4-piperazinopropanol, 1-acetoxyethoxyethyl - 4 - piperazinopropanol, 1-benzyl-4-piperazinopropanol and the like.

The reaction can be readily effected by contacting the reactants in a suitable liquid reaction medium and advisably an inert organic solvent such as n-heptane, toluene and xylene. However, an excess of the piperazinoalkanol can sometimes be used as the reaction medium. Elevated temperatures such as the reflux temperature are generally employed to increase the reaction rate. The transesterification reaction can also be enhanced by adding a catalytic amount of an alkali metal alkoxide, such as sodium methoxide, to the reaction mixture. As the reaction proceeds, the low boiling alcohol formed in the ester interchange reaction is removed by distillation. After the theoretical amount of alcohol is collected the reaction is considered completed. The desired product may be conveniently recovered from the mixture by conventional means such as by fractional distillation.

Some of the compounds of this invention which can be produced according to this process are 1-methyl-4-piperazinopropyl-9-hydroxy-9-fluorene carboxylate, 1-methyl-4-piperazinoisopropyl-9-hydroxy-9-fluorene carboxylate, 1, 2-dimethyl-4-piperazinoethyl-9-hydroxy-9-fluoroene carboxylate, 1,2,5-trimethyl-4-piperazino ethyl-9-hydroxy-9-fluorene carboxylate, 1 - phenylisopropyl-4-piperazinoethyl-9-hydroxy-9-fluorene carboxylate, 1-benzyl-4-piperazinopropyl-9-hydroxy-9-fluorene carboxylate, 1-benzyloxy-4-piperazinoethyl-9-hydroxy-9-fluorene carboxylate, 1-acetoxyethyl-4-piperazinopropyl-9-hydroxy-9-fluorene carboxylate and 1-acetoxyethoxyethyl-4-piperazinopropyl-9-hydroxy-9-fluorene carboxylate.

These compounds in which $R_3$ is a protected hydroxyalkyl or hydroxyalkoxyalkyl can be converted to the free alcohols by hydrolysis of a protecting ester group, such as the acetoxy group, or by catalytic reductive cleavage of a protecting benzyloxy group using for example palladium on charcoal as the catalyst and hydrogen at 2 to 5 atmospheres of pressure and at about 20 to 80° C. in a lower alcohol.

The compounds of this invention can also be produced by reacting 9-hydroxy-9-fluorene carboxylic acid with an appropriate piperazinoalkyl halide. This process can be represented as follows:

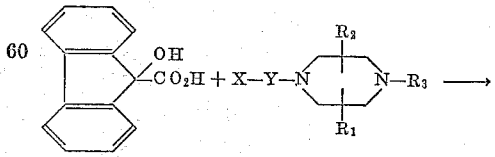

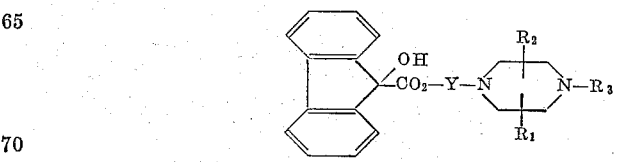

wherein $R_1$, $R_2$, $R_3$ and Y have the significance previously assigned, and X is a reactive halogen and particularly bromine and chlorine.

Some of the piperazinoalkyl halides which can be used in this process are 1-methyl-4-piperazinopropyl chloride, 1-methyl-4-piperazinoisopropyl bromide, 1,2-dimethyl-4-piperazinoethyl chloride, 1,2,5-trimethyl-4-piperazinoamyl chloride, 1-phenylisopropyl-4-piperazinoethyl bromide and 1-acetoxyethyl-4-piperazinopropyl chloride.

The reaction is readily effected by combining the reactants in a suitable inert liquid reaction medium, such as isopropanol, and refluxing the mixture. After filtering and concentrating the reaction mixture in vacuo it is added to water, acidified and the unreacted acid removed with ether. After neutralizing the aqueous layer, the product is extracted with ether and the solution dried. After removing the ether the free base is obtained by vacuum distillation.

Piperazinoalkyl ester of 9-hydroxyfluorene-9-carboxylic acid such as named previously are produced by this process.

Acid addition salts of these compounds are readily produced by contacting the free base with a suitable acid in the presence of a solvent such as acetone, benzene, ethanol, isopropanol or ether. Typical acids which may be used are hydrochloric, sulfuric acid, citric acid, tartaric acid, succinic acid, benzoic acid, phosphoric acid and maleic acid.

These compounds, in the form of nontoxic acid addition salts, exert a pronounced psychotherapeutic effect when administered to animals, and particularly humans. The compounds induce mild muscle relaxation and a relief from anxiety or restlessness without sedating the subject or producing a hypnotic action. In this respect, they differ from 4-ethyl-piperazinoethyl benzilate which has only weak psychotherapeutic properties. Furthermore, the compounds of this invention are useful in clearing up confusional and hallucinogenic states, allowing the subject to establish contact with his environment. Thus, the hyperactivity caused by the administration of the hallucinogen N-ethyl-3-piperidyl phenyl 2-thienyl glycolate (5 mg./kg) to rats is greatly reduced by the administration (20 mg./kg.) of the compounds of this invention. The compounds of this invention mildly increase motor activity in animals and mildly stimulate the central nervous system. 1-methyl-4-piperazinopropyl-9-hydroxy-9-fluorene carboxylate has biphasic activity in that it first induces mild short term sedation but this goes away and mild long term stimulation results.

The compounds of this invention are antispasmodics as nontoxic acid addition salts or quaternary ammonium salts. One of the most potent antispasmodics is 1-phenylisopropyl-4-piperazinopropyl-9-hydroxyfluorene-9-carboxylate which is much more active than 1-benzyl piperazinoethyl benzilate.

Since the compounds form salts with acids they may be used in the isolation and purification of penicillin by forming salts with this antibiotic.

The compounds of this invention may be administered to animals and humans as pure compounds. It is advisable, however, to first combine one or more of the compounds with a suitable pharmaceutical carrier to attain a more satisfactory size to dosage relationship.

Pharmaceutical carriers which are liquid or solid may be used. The preferred liquid carrier is water. Flavoring materials may be included in the solutions as desired.

Solid pharmaceutical carriers such as starch, sugar, talc and the like may be used to form powders. The powders may be used as such or be tableted or be used to fill gelatin capsules. Suitable lubricants like magnesium stearate, binders such as gelatin and disintegrating agents like sodium carbonate in combination with citric acid may be used to form the tablets.

Unit dosage forms such as tablets and capsules may contain any suitable predetermined amount of one or more of the compounds and may be administered one or more at a time at regular intervals. Such forms should, however, generally contain a minimum concentration of 0.1% and preferably 1.0%, by weight of the compound.

A typical tablet may have the composition:

| | Mg. |
|---|---|
| (1) 1 - phenylisopropyl - 4 - piperazinopropyl - 9 - hydroxyfluorene-9-carboxylate dihydrochloride | 10 |
| (2) Starch, U.S.P. | 57 |
| (3) Lactose, U.S.P. | 73 |
| (4) Talc, U.S.P. | 9 |
| (5) Stearic acid | 6 |

Powders 1, 2 and 3 are slugged, then granulated, mixed with 4 and 5, and tableted.

Tablets may also be made of the following ingredients from the stated quantities:

| | Grams |
|---|---|
| (1) 1 - methyl - 4 - piperazinoisopropyl - 9 - hydroxyfluorene-9-carboxylate dihydrochloride | 2000 |
| (2) Lactose, U.S.P. | 800 |
| (3) Dibasic calcium phosphate, U.S.P. | 1527.2 |
| (4) Starch, U.S.P. | 799.3 |
| (5) Calcium stearate | 56.7 |
| (6) Gelatin solution, 1.5 lb./gal. of $H_2O$. | |

Powders 1, 2 and 4 are granulated using enough gelatin solution to wet the mixture. The granules are then combined with the other ingredients, gelatin solution is added to wet the mixture, and it is tableted. The size of the tablets may be varied at will although tablets of 0.25 to 0.50 gm. are satisfactory for many uses. Since the water evaporates, such tablets would contain 87 to 174 mg. of the active agent.

Capsules are prepared by filling No. 3 hard gelatin capsules with the following ingredients, thoroughly mixed:

| | Mg. |
|---|---|
| (1) 1,2 - dimethylpiperazinopropyl - 9 - hydroxyfluorene-9-carboxylate dihydrochloride | 15 |
| (2) Lactose, U.S.P. | 200 |
| (3) Starch, U.S.P. | 16 |
| (4) Talc, U.S.P. | 8 |

The following examples illustrate the preparation of specific compounds within the scope of this invention.

EXAMPLE 1

*1-Methyl-4-Piperazinopropyl-9-Hydroxyfluorene-9-Carboxylate Dihydrochloride*

A mixture consisting of 21.7 g. (0.09 M) of methyl-9-hydroxyfluorene-9-carboxylate, 14.2 g. (0.09 M) of N-methyl-N'-(3-hydroxypropyl)piperazine, 0.5 g. of sodium methoxide and 250 cc. of n-heptane was refluxed for six hours while 5.3 cc. of methanol was collected. The catalyst was filtered off, and the filtrate was washed twice with 100 cc. of water. The organic material was dried over potassium carbonate and the solvent was distilled off. Yield 33.1 g. (95%). The base was dissolved in 300 cc. acetone and acidified with 50 cc. of (4 N) ethereal hydrochloric acid. The solid was collected by filtration, washed with acetone, and dried at 105° C., yield 32.9 g. (82%), M.P. 233–235° C. (dec.). The solid was recrystallized from methanol, yield 21.7 g. (54.3%), M.P. 237° C. (dec.).

*Analysis.*—Calcd. for $C_{22}H_{28}Cl_2N_2O_3$: N, 6.37; Cl, 16.14. Found: N, 6.32; Cl, 15.90.

EXAMPLE 2

*1-Methyl-4-Piperazinoisopropyl-9-Hydroxy-Fluorene-9-Carboxylate Dihydrochloride*

A mixture consisting of 36 g. (0.15 M) of methyl 9-hydroxyfluorene-9-carboxylate, 23.7 g. (0.15 M) of N-methyl-N'-2-hydroxypropyl piperazine, 0.8 g. of sodium methoxide and 375 cc. of n-heptane was refluxed for eight hours while 8 cc. of methanol was collected. The product was isolated as described in Example 1; yield 47 g. (85.5%). The hydrochloride salt was prepared in the same manner as in Example 1, yield 16.1 g. (24.5%), M.P. 234° C. (dec.).

*Analysis.*—Calcd. for $C_{22}H_{28}Cl_2N_2O_3$: N, 6.37; Cl, 16.14. Found: N, 6.43; Cl, 16.27.

EXAMPLE 3

*1,2-Dimethylpiperazinopropyl-9-Hydroxy-Fluorene-9-Carboxylate*

This compound is prepared as in Example 1 by reacting methyl-9-hydroxyfluorene-9-carboxylate with 1,2-dimethylpiperazinopropanol.

EXAMPLE 4

*N-(1-Phenyl-2-Propyl)-4-Piperazinopropyl-9-Hydroxy-Fluorene-9-Carboxylate and Hydrochloride*

A mixture consisting of 12.65 g. (0.048 mole) of N-(1-phenyl-2-propyl)-4-piperazinopropanol, 11.6 g. (0.048 mole) of methyl-9-hydroxyfluorene-9-carboxylate, 0.25 g. of sodium methoxide and 200 cc. of heptane was refluxed for four hours while 3.1 cc. of methanol was collected. The catalyst was filtered off and the filtrate washed twice with 100 cc. of water. The organic material was dried over potassium carbonate and the solvent distilled off, yield 21.65 g. (95.7%).

The base was dissolved in 250 cc. of acetone and acidified with 25 cc. of 4 N ethereal hydrochloric acid. The solid was collected by filtration, washed with acetone, and dried at 100° C., yield 23.1 g., M.P. 231–232° C. (dec.). The solid was suspended in 250 cc. of boiling methanol, filtered, and dried at 100° C., yield 16 g. (61.3%), M.P. 239° C. (dec.).

*Analysis.*—Calcd. for $C_{30}H_{36}Cl_2N_2O_3$: N, 5.15; Cl, 13.05. Found: N, 5.22; Cl, 12.88.

Various changes and modifications of the invention can be made and, to the extent that such variations incorporate the spirit of this invention, they are intended to be included within the scope of the appended claims.

What is claimed is:

1. A member of the group consisting of compounds of the formula

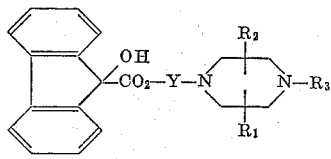

and nontoxic acid addition salts thereof, wherein Y is a lower alkylene group, $R_1$ and $R_2$ are members of the group consisting of hydrogen and lower alkyl groups, and $R_3$ is a member of the group consisting of lower alkyl, phenyl-lower alkyl, hydroxy-lower alkyl, hydroxyl-lower alkoxy-lower alkyl, benzyloxy-lower alkyl, benzyloxy-lower alkoxy-lower alkyl and groups of the formulas

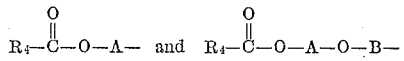

wherein $R_4$ is lower alkyl, A is lower alkylene and B is lower alkylene.

2. 1 - methyl - 4 - piperazinopropyl - 9 - hydroxy-fluorene-9-carboxylate.

3. 1 - methyl - 4 - piperazinoisopropyl - 9 - hydroxy-fluorene-9-carboxylate.

4. 1,2 - dimethylpiperazinopropyl - 9 - hydroxyfluorene-9-carboxylate.

5. 1-lower alkyl-4-piperazino lower alkyl-9-hydroxy-fluorene-9-carboxylate.

6. N - (1 - phenyl - 2 - propyl) - 4 - piperazinopropyl-9-hydroxy-fluorene-9-carboxylate.

7. N - (phenyl - lower alkyl) - 4 - piperazino - lower alkyl-9-hydroxy-fluorene-9-carboxylate.

References Cited in the file of this patent

UNITED STATES PATENTS

| | | |
|---|---|---|
| 2,676,971 | Cusic et al. | Apr. 27, 1954 |
| 2,804,422 | Schumann et al. | Aug. 27, 1957 |
| 2,838,441 | Allen et al. | June 10, 1958 |
| 2,891,957 | Allen et al. | June 23, 1959 |
| 3,043,842 | Craig | July 10, 1962 |
| 3,045,017 | Gailliot et al. | July 17, 1962 |

OTHER REFERENCES

Burtner et al.: Jour. Amer. Chem. Soc., vol. 65, pp. 262–266 (1943).

Hackh's Chem. Dict., p. 18 (Third Edit., 1944).

Cusic et al.: Jour. Org. Chem., vol. 16, p. 1928 (1951).

Ide et al.: Jour. Amer. Chem. Soc., vol. 76, pp. 1124–1125 (1954).

Light et al.: Jour. Amer. Pharm. Asso., vol. 46, pp. 279–287 (1957).

Brit. Med. Jour., pp. 938–939, April 19, 1958.

Goodwin et al.: The Pharm. Jour., vol. 181, pp. 233–235, September 1958.

Laurence et al.: Brit. Med. Jour., pp. 700–702 (1958).

Keele: The Lancet, pp. 243–246, January 31, 1959.